UNITED STATES PATENT OFFICE.

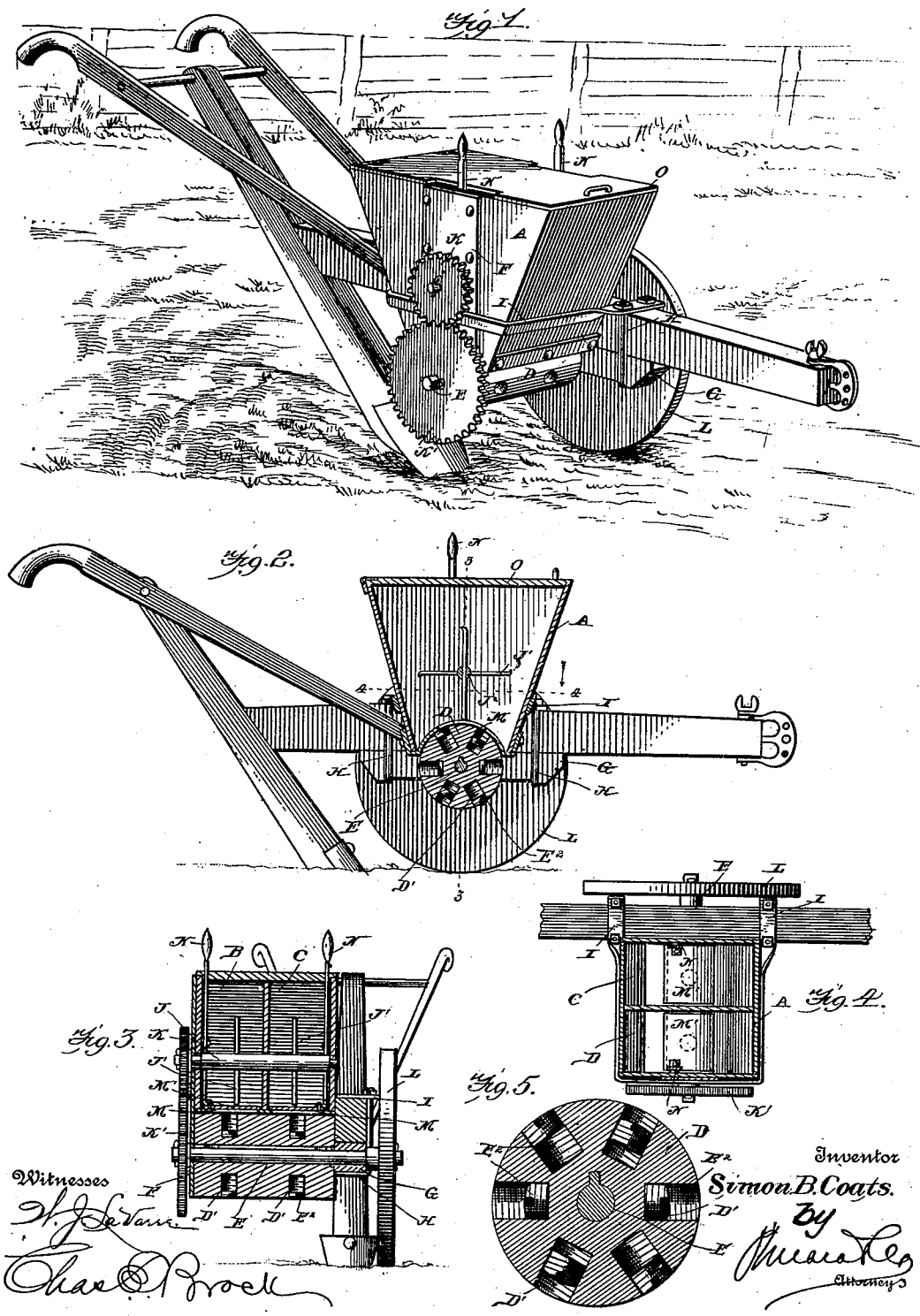

SIMON B. COATS, OF BROOK, SOUTH CAROLINA.

COMBINED PLANTER AND FERTILIZER-DISTRIBUTER.

SPECIFICATION forming part of Letters Patent No. 667,386, dated February 5, 1901.

Application filed October 23, 1897. Serial No. 656,151. (No model.)

*To all whom it may concern:*

Be it known that I, SIMON B. COATS, residing at Brook, in the county of Lexington and State of South Carolina, have invented a new and useful Combined Planter and Fertilizer-Distributer, of which the following is a specification.

This invention relates to improvements in combined planters and fertilizer-distributers; and the object of the same is to provide a device which may be readily attached to the stock of the plow for the purpose of planting seed and distributing fertilizer either simultaneously or independently, as may be desired, and also in which the quantity of seed and fertilizer dropped may be varied, as also the distance between the hills, the device being extremely simple in construction and effective in operation.

With the above objects in view the invention consists of a hopper divided into compartments for containing the seed and fertilizer, a dropping-disk journaled beneath the outlets of said compartments and provided with pockets to receive the seed and fertilizer, said pockets being interiorly screw-threaded to receive plugs which are adjustable therein to vary the capacity thereof, a driving mechanism for rotating said dropping-disk, and also agitators which are located in the hopper-compartments, and clamping devices for attaching the planter to the plow-stock.

My invention further consists in the improved construction, arrangement, and combination of parts hereinafter more fully described and afterward specifically pointed out in the claims.

In order to enable others skilled in the art to which my invention most nearly appertains to make and use the same, I will now proceed to describe its construction and operation, having reference to the accompanying drawings, forming part of this specification, in which—

Figure 1 is a perspective view of my device in position upon a plow. Fig. 2 is a vertical longitudinal sectional view of the same. Fig. 3 is a vertical transverse section. Fig. 4 is a section on the line 4 4 of Fig. 2 looking in direction indicated by arrow. Fig. 5 is a transverse sectional view of the dropping-disk, said section being taken through the pockets formed therein.

Referring to the accompanying drawings, A indicates the hopper, which is divided by a vertical partition into the compartments B and C for containing the seed and fertilizer. The bottom of the hopper is concaved to conform to the contour of the dropping-disk D, which is positioned therebeneath, said disk being removably mounted upon the driving-shaft E, the shaft containing a feather which fits into a splineway formed in the disk. The drive-shaft E is journaled at one end in a hanger F, secured to the hopper, and at its opposite end in a block G, which is clamped to the under side of the plow-stock by the clips H, the legs of which extend through the projecting ends of the band I, secured to the hopper, nuts being provided upon the extremities of the clips, so that the hopper and journal-block G are firmly attached to the plow.

Journaled in the hopper is a shaft J, having thereon the fingers J', which fingers are located in the respective hopper-compartments for the purpose of agitating and feeding the seed and fertilizer and preventing clogging of the same. Upon the end of the shaft, on the outside of the hopper, is a gear-wheel K, which meshes with a similar wheel K' upon one end of driving-shaft E, while upon the opposite end of the last-named shaft, which projects through the block G, is a driving-wheel L, which moves upon the surface of the ground and imparts motion to the dropping-disk and the agitator.

Egress-openings M are formed in the bottom of each hopper-compartment, and controlling the same are the slides M', which are operated by the hand-levers N, said levers projecting from the top of the hopper, the hinged lid O of the latter being cut out to permit the movement thereof.

Formed in the dropping-disk about its periphery are the interiorly-screw-threaded pockets D', there being a series of pockets for each compartment, the capacity of the same being regulated by the screw-threaded plugs $E^2$, which are adjustable therein, so that said pockets may be entirely closed, if desired, and the distance between the hills thus regulated.

In operation the seed and fertilizer are placed in their respective compartments and the slides controlling the egresses opened, when the seed and fertilizer will be received in the pockets of the dropping-disk as the latter is rotated and the former brought in line with said egresses and deposited in the ground in the desired quantity and at the desired distance apart. By closing the egress of either of the compartments the seed or fertilizer may be dropped separately, thus adapting the machine for use as a planter or fertilizer-distributer or planter and fertilizer-distributer, as may be desired.
From the above description it will be seen that I have provided a planter and fertilizer-distributer which is extremely simple in its construction, it being quickly and readily attached to or detached from the plow-stock, and also a device in which the quantity of seed and fertilizer dropped therefrom may be varied, as also the distance between the hills.

While I have illustrated and described the best means now known to me for carrying out my invention, I do not wish to be understood as restricting myself to the exact details of construction shown and described, but hold that any slight changes or variations such as might suggest themselves to the ordinary mechanic will properly fall within the limit and scope of my invention.

Having thus fully described my invention, what I claim as new, and desire to secure by Letters Patent, is—

1. The combination with a plow-beam, of a hopper having an egress-opening, a band or strap passing around the hopper and having its ends perforated and extending on the upper side of the plow-beam, a block positioned on the under side of the beam, clips passing around said block and beam with their ends passing through the perforations of the strap and threaded to receive securing-nuts, a shaft beneath the hopper having one end supported by a plate depending from the hopper and its opposite end supported by the block, a dropping-disk on said shaft beneath the egress-opening and provided with a pocket, and a ground-wheel carried by said shaft, substantially as described.

2. The combination with a plow-beam, of a hopper having an egress-opening in its bottom wall, a band or strap passing around the hopper and having its ends resting upon the upper side of the plow-beam and perforated at opposite sides of said beam, a block positioned on the under side of the beam, U-shaped clips passing around the under side of said block with the legs thereof extending on the respective sides of the beam with their ends passing through the perforations of the straps and threaded to receive securing-nuts, a shaft beneath the hopper having one end supported by said block, a plate secured to and depending from the hopper and supporting the opposite end of said shaft, a dropping-disk on said shaft beneath the egress-opening of the hopper and provided with a pocket, and a ground-wheel carried by said shaft, substantially as described.

SIMON B. COATS.

Witnesses:
B. N. BODIE,
D. L. GUNTER.